Patented Dec. 8, 1925.

1,564,413

UNITED STATES PATENT OFFICE.

CLAYTON M. HOFF, OF CLEVELAND, OHIO, ASSIGNOR TO THE GRASSELLI CHEMICAL COMPANY, OF CLEVELAND, OHIO, A CORPORATION OF OHIO.

PROCESS OF ELECTROPLATING METALLIC CADMIUM AND ELECTROLYTIC BATH THEREFOR.

No Drawing. Application filed January 17, 1924. Serial No. 686,898.

*To all whom it may concern:*

Be it known that I, CLAYTON M. HOFF, a citizen of the United States, residing at Cleveland, in the county of Cuyahoga and State of Ohio, have invented certain new and useful Improvements in Processes of Electroplating Metallic Cadmium and Electrolytic Bath Therefor, of which the following is a specification.

This invention relates to a process of electroplating metallic cadmium and to a novel electrolytic bath or solution containing cadmium, from which metallic cadmium may be electroplated in the form of pure, uniform and smooth deposits.

As is known, thin deposits of cadmium upon other metals, for instance iron and steel, such as may be produced by electrodeposition, possess admirable protecting properties, but considerable difficulty has been encountered in devising a satisfactory method for producing deposits or coatings of cadmium having desired characteristics. Among the difficulties encountered may be mentioned the inability to form deposits of the desired purity, uniformity and smoothness. By the employment of my invention these difficulties are overcome and in addition I am able to deposit cadmium rapidly and quantitatively, if desired, from solutions thereof prepared in accordance with the invention, even when such solutions contain also zinc. As will be apparent, the invention may be put to uses other than for the electrodeposition of cadmium in the form of protective or ornamental coatings upon metals. For instance, the invention may be applied for the quantitative determination of cadmium or for the quantitative determination of zinc in the presence of cadmium or for the quantitative determination of both cadmium and zinc in admixtures thereof. A noteworthy feature of the invention is that it provides a process whereby the commercial supplies of cadmium available for plating purposes, both in the form of the metal and in the form of compounds of cadmium which usually contain zinc or zinc compounds, may be used directly and without preliminary purification for the removal of zinc.

The electroplating solution of my invention may be prepared by dissolving cadmium oxid or hydroxid or a salt of cadmium such as the sulfate, either pure or contaminated or mixed with zinc oxid or hydroxid or a salt such as the sulfate, in an aqueous solution of ammonia and adding to the resulting solution a cyanide. Solutions so prepared possess the property of permitting the electrodeposition of pure cadmium rapidly and completely, if desired, in the form of smooth homogeneous deposits, presumably due to the nature of the chemical combination of the cadmium or the cadmium and zinc in the soluble compounds thereof present in the solutions.

An application of the invention for the quantitative determination of cadmium and zinc is illustrated in the following example, it being understood of course that the invention is not limited to the specific details recited therein, excepting in so far as such details are embodied in the appended claims.

A mixture of cadmium sulfate and zinc sulfate containing say equal parts by weight of the two metals is dissolved in a quantity of water only sufficient to give a strong solution, say about one-half saturated at room temperature and the resulting aqueous solution is treated with a strong aqueous solution of ammonium hydroxid until the hydroxids of zinc and cadmium first formed redissolve. To each 5 cubic centimeters of the resulting ammoniacal solution are added about 10 cubic centimeters of a 14% ammonium hydroxid solution and about 7.5 grams of sodium cyanid and the resulting solution is diluted with water to about four times the volume of the ammoniacal solution of the zinc and cadmium salts. The diluted solution is then electrolyzed at room temperature, using a potential difference of about 4 volts between electrodes spaced about 15 centimeters apart and a current density of about 1 ampere per 100 square centimeters of electrode surface. The deposition of the cadmium content of the solution under the specified conditions is complete in about 3 hours, none of the zinc being precipitated. In order to complete the quantitative determination of the cadmium, the cathode, for instance platinum gauze carrying the cadmium deposit, is removed from the electrolyte while washing with water and without breaking the current flow, washed with alcohol, dried at 100° C. and weighed.

For the determination of the zinc content of the residual solution about 20 grams of caustic soda are added for each 20 cc. of solution and its ammonia content removed by boiling. The resulting solution is then cooled and electrolyzed at room temperature, using a voltage across the electrodes of 4 to 5 volts and a current density of about 2 amperes per 100 square centimeters of electrode surface, the distance between the electrodes being about 15 centimeters. About two hours are sufficient to complete the deposition of the zinc. The zinc may be deposited directly upon the cadmium coated electrode and the deposit washed, dried and its weight determined in the same way as the cadmium coating.

The following table illustrates the accuracy of the process for the quantitative determination of cadmium and zinc in mixtures thereof:

| Test | Weight taken | | Weight found | |
|---|---|---|---|---|
| | Cadmium | Zinc | Cadmium | Zinc |
| 1 | .4000 | .0000 | .3988 | .0000 |
| 2 | .4000 | .0000 | .3990 | .0000 |
| 3 | .4000 | .0100 | .3985 | .0110 |
| 4 | .3000 | .0500 | .3008 | .0483 |
| 5 | .4000 | .4000 | .4002 | Not determined. |
| 6 | .2000 | .6000 | .2009 | Do. |

The application of the invention for commercial electroplating is apparent from the foregoing example, it being understood of course that in electroplating cadmium as a protective coating upon metals the deposition of the cadmium content of the electrolyte need not be carried to completion, but the electrodeposition may be carried to any suitable point and the electrolyte then renewed by the addition to it of the necessary ingredients or the renewing ingredients may be added during the electrolysis until the zinc content of the electrolyte reaches such a value as to interfere with the further deposition of pure cadmium. It will also be understood that the presence of zinc in the electrolyte is not essential so far as the plating of cadmium is concerned. In this respect the zinc content of the raw cadmium material is to be regarded as an impurity and in the application of the process for producing protective coatings of cadmium raw material containing as small a proportion of zinc as is consistent with its cost should be selected. It will also be understood that raw materials other than cadmium and zinc oxids, hydroxids and sulfates may be used as starting materials, for instance other salts of zinc and cadmium, although in this connection it is noted that the salt forming group of some salts may interfere with the operation of the process. The sulfates are perhaps the cheapest salts of the metals and are readily formed from other salts or compounds or from the metals themselves and therefore constitute a very satisfactory starting material. Variations in the concentration of the electrolyte, proportions of the reagents, the temperature of operation, voltages and current densities may be made by one skilled in the art to which this invention relates without departure from the spirit of the invention. It is further noted that the use of suitable addition agents designed to produce smoother and more uniform deposits, such as inorganic salts and organic materials of which a large number are known, is not to be regarded as a departure from the invention.

Electro-deposits of cadmium free of zinc, such as those produced in accordance with my invention, have been found to be very resistant as compared with deposits containing zinc, as has been demonstrated by the salt spray test.

I claim:

1. Process of electrodepositing cadmium which comprises preparing an alkaline solution containing a compound of cadmium, a compound of ammonia and a cyanide and electrolyzing said solution.

2. Process of electrodepositing cadmium which comprises preparing an ammoniacal solution of a compound of cadmium containing cyanide and electrolyzing said solution.

3. Process of electrodepositing cadmium which comprises dissolving a compound of cadmium in an aqueous solution of ammonia, dissolving an alkali metal cyanide in the resulting solution and subjecting the same to electrolysis.

4. Processs of electrodepositing cadmium which comprises electrolyzing an aqueous solution containing the reaction products of ammonia water, a compound of cadmium, and an alkali metal cyanide.

5. Process of electrodepositing cadmium from a solution thereof containing zinc which comprises preparing an ammoniacal solution of cadmium and zinc containing an alkali metal cyanide and electrolyzing said solution.

6. Process of separating cadmium and zinc from mixtures containing the same or their compounds which comprises dissolving said materials in an aqueous solution of ammonia, adding a cyanide to the solution, electrolyzing the solution until the deposition of cadmium is complete, adding caustic soda to the residual solution and heating the same until the ammonia content thereof is expelled therefrom, and subjecting the resulting solution to electrolysis.

7. Process of electrodepositing cadmium which comprises preparing a mixture of cadmium sulfate and zinc sulfate from a raw material containing cadmium and zinc or their compounds, dissolving the mixture in an aqueous solution of ammonia, adding an alkali metal cyanide to the solution and subjecting the resulting solution to electrolysis.

8. As an electrolyte for the electrodeposition of cadmium, an aqueous solution of a compound of cadmium, ammonia, and alkali metal cyanide and their reaction products.

9. An electrolyte for the electrodeposition of cadmium comprising the reaction products of cadmium sulfate, aqua ammonia, and sodium cyanide.

10. As an electrolyte for the electrodeposition of cadmium, an ammoniacal aqueous solution containing cadmium, zinc and a soluble cyanide.

11. An electrolyte for the electrodeposition of cadmium comprising the reaction products of compounds of cadmium and zinc, aqua ammonia, and an alkali metal cyanide.

In testimony whereof, I affix my signature.

CLAYTON M. HOFF.